Patented Sept. 26, 1950

2,523,580

UNITED STATES PATENT OFFICE 2,523,580

PRODUCTION OF ALKYL PYRIDINES

John E. Mahan, Bartlesville, Okla., assignor to Phillips Petroleum Company, a corporation of Delaware No Drawing. Application December 11, 1944, Serial No. 567,780

6 Claims. (Cl. 260—290)

This invention relates to the production of alkyl pyridines.

In one of its more specific aspects the present invention relates to the vapor phase interaction of selected aliphatic aldehydes and ammonia in the presence of a highly active contact catalyst to produce valuable pyridine derivatives. The process of this invention is especially useful for the production of 2-methyl-pyridine and 4-methylpyridine.

Pyridine and its alkyl homologs have long been recognized as important intermediates in the synthesis of dye stuffs, pharmaceuticals, insecticides and the like, as well as having valuable applications per se as solvents. More recently the employment of certain pyridine derivatives in the synthesis of drugs of the sulfanilamide type and as comonomers in the production of synthetic rubber has increased the demand for pyridine derivatives far beyond the productive capacity of the coal-tar industry which at present is the principal source of supply. The most valuable pyridine homologs from the viewpoint of chemical reactivity are those containing alkyl substituents in the 2 and 4 positions. In such alkyl pyridines, hydrogen atoms on the carbon atom adjacent to the nucleus are chemically active and enter into a wide variety of condensation reactions. The most reactive of 2- and 4-alkyl pyridines are the methyl homologs and as such are in great demand as chemical intermediates.

Methods of synthesis of pyridine homologs, other than certain obviously impractical classical procedures, have been confined to condensation reactions of ammonia with acetylene, alcohols, ketones and aldehydes. For the most part little progress has been reported with these reactions since the yields of mono-methyl-pyridines seldom exceed 5 mol per cent of the theory based on the charge of aldehyde or its equivalent. The most common contact catalysts reported for this type of synthesis include silicia gel, alumina and various other metallic oxides such as those of cadmium, iron, zinc, thorium, etc. However, previously reported catalysts have universally failed to increase the yield of mono-methyl-pyridines to an attractive economic level.

It is, therefore, an object of this invention to provide an economical process for the production of alkyl pyridines from the catalytic condensation of ammonia with aliphatic carbonyl compounds selected from the group corresponding to the formula R—CO—R' where R may be an alkyl or alkenyl group and R' may be a hydrogen, alkyl or alkenyl group.

It is a further object of the present invention to provide an efficient synthetic silica-alumina contact catalyst to promote the production of pyridines from the reaction of ammonia with aliphatic aldehydes and selected ketones.

A still further object is to provide an improved process for the production of 2-methyl- and 4-methylpyridines through vapor-phase condensation of ammonia with acetaldehyde in the presence of a synthetic gel type catalyst comprising silica promoted with minor proportions of alumina.

I have now found that significant economic improvements with respect to the conventional ammonia-aldehyde and similar pyridines-producing reactions can be realized by effecting such reactions in the presence of a preferred synthetic silica-alumina catalyst. Thus, in the acetaldehyde-ammonia systems, I have found that greatly increased yields of alkyl pyridines are obtained and that the increased yields are largely manifested in increased production of the highly desired 2-methyl- and 4-methylpyridines. While this disclosure is particularly concerned with the acetaldehyde- or paraldehyde-ammonia system, the beneficial results of my preferred catalyst composition is not limited thereto, but is apparent with other aliphatic aldehyde-ammonia and ketone-ammonia systems. In some instances the yield of alkyl pyridines as based on carbonyl compound charged may be increased 25 fold over data reported in the literature for the same system, but with different catalyst compositions.

In its broader aspects my improved process comprises the passage of a selected vaporized aliphatic carbonyl derivative in admixture with a molal excess of ammonia with or without an inert diluent over a preferred silica-alumina composition catalyst at suitable conversion temperatures.

The catalyst of this invention is a silica-alumina composition characterized by the relative proportions of alumina and silica and by the procedure employed in its manufacture. Catalysts suitable for use in the present process have been prepared by methods described by McKinney in U. S. Patents 2,142,324 and 2,147,985. A hydrous silica gel is first prepared from an alkali silicate and an acid. The freshly formed gel, either in a wet or partially dry condition, is treated with an aluminum salt solution such as the chloride or sulfate. This treated gel is then washed free of water-soluble compounds and dried. The alumina, presumably in the form of a hydrous oxide, is selectively adsorbed by the hydrous silica and is not removed by subsequent washing operations. This minor proportion of alumina will generally not be in excess of 10 per cent by weight, and will more often be between about 0.1 and 1.5 to 2.0 per cent by weight.

Silica-alumina catalysts, prepared according to above procedure, have been found to possess unique properties particularly suited to the objects of the present invention; thus it is not to be inferred that all commercially available silica-alumina compositions may be employed with the advantages inherent in my preferred catalyst. Although it is well known that both silica gel and alumina have been used as catalysts for the reaction systems of the present process, my preferred composition possesses a high degree of activity and specificity not exhibited by either ingredient alone. In order to establish this fact beyond all doubt a series of experiments employing the acetaldehyde-ammonia system was carried out in order to approximate optimum operating conditions for the silica gel catalyst. Various alumina catalysts, activated clays (silica-alumina) and the present synthetic silica-alumina catalyst were then tested under identical conditions. In all tests the acetaldehyde: ammonia mol ratio was held constant at 1:3; the catalyst temperature was maintained between 800 and 950 F.; and 4 liters of nitrogen diluent per mol of acetaldehyde was employed. The effluent vapors were condensed. Excess ammonia was stripped from the crude product. Non-basic reaction products along with unreacted intermediate were segregated by steam distillation of the acidified crude product. The acid residue from the steam distillation was made alkaline with caustic and again distilled with steam to provide a water-pyridines distillate. The pyridine homologs were then recovered from the aqueous distillate by solvent extraction employing ether. Chloroform or selected hydrocarbons may be used for the solvent extraction or azeotropic distillation may be employed. The mixed alkyl pyridines thus obtained were further purified by fractional distillation. Under these conditions which are not necessarily optimum for the present preferred catalyst, the following tabulation reveals the unexpected results obtainable with my synthetic silica-alumina composition.

tiglic aldehyde, acetone, methyl ethyl ketone and the like.

Operating conditions for optimum yields of pyridine homologs will vary somewhat with the carbonyl body employed; however, certain generalizations apply to substantially all cases. The present catalyst is active toward virtually all systems over the range of 500° F. to 1200° F. with a more narrow preferred range of 700 to 1000° F. being generally applicable. In systems employing the more thermally stable aldehydes and ketones, superatmospheric pressures may be advantageously employed, while high boiling aldehydes may be condensed more economically at atmospheric pressure. In general pressures are selected from a range extending from atmospheric to about 500 pounds per square inch gage. In all systems a molal excess of ammonia is preferred in the feed and in many instances an inert diluent such as methane, ethane, or nitrogen is useful in preventing side reactions. With my preferred catalyst short contact times are favorable to the production of pyridine homologs. In general the residence or contact time is adjusted at 0.1 to 5 seconds; however, in some instances longer time of contact may be necessary.

In further illustration of the specific advantages of the present invention, the following exemplary operations are offered. Since various modifications will be apparent, these examples are not to be construed as limitations upon my process.

EXAMPLE I

The synthesis of 2-methyl- and 4-methylpyridine was accomplished at atmospheric pressure by vapor phase interaction of acetaldehyde and ammonia over the previously described synthetic silica-alumina catalyst comprising approximately 1.5 per cent alumina and about 98.5 per cent silica gel. Acetaldehyde was charged at a predetermined rate along with nitrogen to a combination vaporizing and preheating furnace. Gaseous ammonia was metered into the preheated aldehyde stream just ahead of the catalyst zone. The catalyst case comprised a vertically arranged, cylindrical steel vessel of 165 ml. capacity enclosed in an electrically

TABLE I

Effect of various catalysts on the yield [1] of alkyl pyridines from the acetaldehyde-ammonia system

| Catalyst | | $Al_2O_3$ | Activated $Al_2O_3$ (Alorco) | Silica Gel | Super [2] Filtrol | Synthetic Silica-Alumina |
|---|---|---|---|---|---|---|
| 2-Methylpyridine | mol per cent | 6.4 | 9.5 | 16.2 | 13.1 | 20.4 |
| 4-Methylpyridine | do | 7.7 | 10.6 | 10.8 | 13.4 | 17.6 |
| High-boiling pyridines | do | 8.5 | 9.0 | 8.8 | 9.5 | 10.4 |
| Total pyridines | do | 22.6 | 29.1 | 35.8 | 36.0 | 48.4 |

[1] Yield expressed as mol per cent of theory based on aldehyde charged.
[2] Natural silica-alumina clay (activated montmorillonite).

The present process is preferably operated to produce 2-methyl- and 4-methylpyridines because of the ready availability of acetaldehyde in its trimeric form (paraldehyde) and because of the greater demand for the above mono-methyl-pyridines. However, my preferred catalyst may also be used in the preparation of higher molecular weight homologs through the use of other aliphatic aldehydes such as propionaldehyde, butyraldehyde, valeraldehyde, crotonic aldehyde, heated furnace. Effluent vapor from the catalyst zone was passed through a water-cooled condenser and then into a trap cooled to Dry-Ice temperature. After evaporation of ammonia, the condensate in the low temperature trap was combined with the initial condensate for further processing. Separation of basic from non-basic material was effected by treating the ammonia-free crude product with 6N hydrochloric acid and steam distilling to remove non-basic, volatile organic matter. The aqueous residue was rendered alkaline with sodium hydroxide and steam distilled to separate the pyridines from the alkaline solution. The steam distillate was next extracted with ether and the resulting ether solution of pyridines dried over magnesium sulfate. After removal of the ether by simple distillation, the crude pyridine bases were fractionally distilled in an efficient still. A summary of operating conditions and results is presented in the subjoined tabulation.

TABLE 2

| | |
|---|---|
| Catalyst volume, ml. | 165 |
| Feed rate: | |
| Acetaldehyde, mols per hour | 0.5 |
| Ammonia, mols per hour | 1.5 |
| Diluent feed rate, liters $N_2$ per hour (STP) | 2.0 |
| Reaction temperature, °F. | 800–950 |
| Contact time, seconds | 2 |
| Yield data (based on aldehyde charged): | |
| 2-methylpyridine, mol percent | 20.4 |
| 4-methylpyridine, mol percent | 17.6 |
| High-boiling alkyl pyridines, mol percent | 10.4 |

EXAMPLE II

The system of Example I was subjected to reaction over the same silica-alumina catalyst at a gage pressure of 100 pounds per square inch. The catalyst case effluent was worked up in a manner analogous to that previously described. A summary of reaction conditions and results is given in Table 3.

TABLE 3

| | |
|---|---|
| Catalyst volume, ml. | 165 |
| Feed rate: | |
| Acetaldehyde, mols per hour | 1.0 |
| Ammonia, mols per hour | 3.0 |
| Diluent feed rate, liters $N_2$ per hour (STP) | 4.0 |
| Reaction pressure, p. s. i. g. | 100 |
| Reaction temperature, °F. | 850–950 |
| Contact time, seconds | 1 |
| Yield data (based on aldehyde charged): | |
| 2-methylpyridine, mol percent | 21.2 |
| 4-methylpyridine, mol percent | 18.0 |
| High-boiling alkyl pyridines, mol percent | 15.5 |

I claim:

1. A process for the production of an alkyl derivative of pyridine which comprises the chemical interaction of ammonia and a saturated aliphatic aldehyde as the sole reactive constituents of the anhydrous reactant mixture in the presence of a catalyst comprising silica gel promoted with from 0.1 to 2.0 weight per cent alumina.

2. A process for the production of an alkyl derivative of pyridine which comprises the chemical interaction of ammonia and a saturated aliphatic aldehyde as the sole reactive constituents of the anhydrous reactant mixture in the presence of a catalyst comprising silica gel promoted with from 0.1 to 2.0 weight per cent alumina for a period of time within the range of 0.1 to 5.0 seconds.

3. A process for the production of monomethylpyridines which comprises the chemical interaction of ammonia and acetaldehyde as the sole reactive constituents of the anhydrous reactant mixtures in the presence of a catalyst comprising silica gel promoted with from 0.1 to 2.0 weight per cent alumina and in the presence of an inert diluent for a period of time within the range of 0.1 to 5.0 seconds.

4. A process for the production of monomethylpyridines which comprises reacting a mixture consisting essentially of ammonia and acetaldehyde in the presence of a catalyst comprising silica promoted with from 0.1 to 2.0 weight per cent alumina for a period of time within the range of 0.1 to 5.0 seconds and at a temperature of 500 to 1200° F.

5. A process according to claim 4 wherein the reaction temperature is within the range of 700 to 1000° F.

6. A process according to claim 4 wherein a stoichiometric excess of ammonia over that required to react with acetaldehyde is used.

JOHN E. MAHAN.

REFERENCES CITED

The following references are of record in the file of this patent:

FOREIGN PATENTS

| Number | Country | Date |
|---|---|---|
| 463,530 | Germany | 1928 |
| 133,474 | Switzerland | 1929 |
| 332,623 | Great Britain | July 22, 1930 |
| 334,193 | Great Britain | Aug. 25, 1930 |
| 534,494 | Great Britain | 1941 |

OTHER REFERENCES

"Synthesis of Nitrogen Compounds" by Hollins, 1924, pp. 218, 219.

Ser. No. 387,106, Stitz (A.P.C.), published July 13, 1943.